US011212226B2

United States Patent
Yang et al.

(10) Patent No.: US 11,212,226 B2
(45) Date of Patent: Dec. 28, 2021

(54) DATA PROCESSING METHOD AND APPARATUS, AND DEVICE

(71) Applicant: Huawei Technologies Co., Ltd., Shenzhen (CN)

(72) Inventors: Jiao Yang, Xi'an (CN); Tingfang Tang, Shenzhen (CN); Yan Li, Beijing (CN); Yongcui Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/874,074

(22) Filed: May 14, 2020

(65) Prior Publication Data

US 2020/0274805 A1 Aug. 27, 2020

Related U.S. Application Data

(63) Continuation of application No. PCT/CN2018/106032, filed on Sep. 17, 2018.

(30) Foreign Application Priority Data

Nov. 17, 2017 (CN) .......................... 201711143738.3

(51) Int. Cl.
*H04L 12/741* (2013.01)
*H04L 12/28* (2006.01)
(Continued)

(52) U.S. Cl.
CPC ............ *H04L 45/745* (2013.01); *H04L 12/28* (2013.01); *H04L 49/25* (2013.01); *H04L 61/103* (2013.01);
(Continued)

(58) Field of Classification Search
CPC ..... H04L 45/745; H04L 45/02; H04L 61/203; H04W 12/71; H04W 36/0022
See application file for complete search history.

(56) References Cited

U.S. PATENT DOCUMENTS

2011/0317703 A1* 12/2011 Dunbar ................. H04L 12/462
370/392
2012/0196600 A1 8/2012 Mizukoshi
(Continued)

FOREIGN PATENT DOCUMENTS

CN 101043392 A 9/2007
CN 101197780 A 6/2008
(Continued)

OTHER PUBLICATIONS

Huawei, "Interim agreement on HO and TAU principles," SA WG2 Meeting #118, Nov. 14-18, 2016, Reno, USA, S2-166674, 7 pages.
(Continued)

*Primary Examiner* — Mohamed A Kamara
(74) *Attorney, Agent, or Firm* — Conley Rose, P. C.

(57) ABSTRACT

A data processing method includes obtaining, by a session management function (SMF) network element from an external network element, a media access control (MAC) address of a terminal device and an Internet Protocol (IP) address corresponding to the MAC address, and sending, by the SMF network element, the MAC address and the IP address to a first user plane function (UPF) network element,
(Continued)

where the MAC address and the IP address are used to send an Address Resolution Protocol (ARP) message, and the ARP message includes the MAC address and the IP address.

20 Claims, 11 Drawing Sheets

(51) Int. Cl.
    *H04L 12/947*     (2013.01)
    *H04L 29/12*     (2006.01)
    *H04L 29/08*     (2006.01)

(52) U.S. Cl.
    CPC ............ *H04L 61/20* (2013.01); *H04L 69/324* (2013.01); *H04L 61/6022* (2013.01)

(56) References Cited

U.S. PATENT DOCUMENTS

| | | | |
|---|---|---|---|
| 2016/0309397 A1 | 10/2016 | Zhou et al. | |
| 2017/0230877 A1 | 8/2017 | Claassen et al. | |
| 2020/0107388 A1* | 4/2020 | Yu | H04W 76/25 |
| 2020/0128087 A1* | 4/2020 | Yu | H04L 67/146 |

FOREIGN PATENT DOCUMENTS

| | | |
|---|---|---|
| CN | 101471898 A | 7/2009 |
| CN | 101510900 A | 8/2009 |
| CN | 101741824 A | 6/2010 |
| CN | 106936804 A | 7/2017 |
| EP | 1883205 A1 | 1/2008 |
| WO | 2015100593 A1 | 7/2015 |

OTHER PUBLICATIONS

Samsung, "Baseline description for Network Function selection," SA WG2 Meeting #118bis, Jan. 16-20, 2017, Spokane, USA, S2-170258, 4 pages.

Catt, "Update PDU session establishment," SA WG2 Meeting #119, Feb. 13-17, 2017, Dubrovnik, Croatia, S2-171456, 5 pages.

T-Mobile USA Inc, "Enhancing IP Allocation between UPF and SMF," SA WG2 Meeting #120, Mar. 27-31, 2017, Busan, South Korea, S2-172030, 5 pages.

LG Electronics, et al., "TS 23.501: Consideration on SMF selection at PDU session establishment," SA WG2 Meeting #121, May 15-19, 2017, Hangzhou, China, S2-173189, 4 pages.

Nokia, et al., "TS 23.501: SMF management due to far mobility," SA WG2 Meeting #S2-121, May 29-Jun. 2, 2017, Hangzhou, China, S2-173469, 7 pages.

Interdigital, "23.502: Correction of figures 4.9.1.1.2-1 and 4.9.1.1.3-1," SA WG2 Meeting #122, Jun. 26-30, 2017, San Jose Del Cabo, Mexico, S2-174384, 5 pages.

NTT Docomo, "23.502: handover from EPS to 5GS procedure using Nx interface," SA WG2 Meeting #122, Jun. 26-30, 2017, Cabo, Mexico, S2-174564, 6 pages.

LG Electronics, "TS 23.502: DN authorization and PDU session anchor relocation," SA WG2 Meeting #122, May 26-30, 2017, San Jose Del Cabo, Mexico, S2-174591, 11 pages.

3GPP TS 23.501, V1.5.0, "3rd Generation Partnership Project; Technical Specification Group Services and System Aspects; System Architecture for the 5G System; Stage 2 (Release 15)," Nov. 2017, 170 pages.

3GPP TS 23.502 V1.3.0 "3rd Generation Partnership Project; Technical Specification Group Services and System Aspects; Procedures for the 5G System; Stage 2 (Release 15)," Nov. 2017, 215 pages.

* cited by examiner

DATA PROCESSING METHOD AND APPARATUS, AND DEVICE

CROSS-REFERENCE TO RELATED APPLICATIONS

This application is a continuation of International Patent Application No. PCT/CN2018/106032 filed on Sep. 17, 2018, which claims priority to Chinese Patent Application No. 201711143738.3 filed on Nov. 17, 2017. The disclosures of the aforementioned applications are hereby incorporated by reference in their entireties.

TECHNICAL FIELD

This application relates to the field of communications technologies, and in particular, to a data processing method and apparatus, and a device.

BACKGROUND

Currently, in a process in which a terminal device exchanges data with an application server in a local area network (LAN), a user plane function (UPF) network element and a switch in the LAN need to forward a data packet.

When sending an uplink data packet to the application server in the LAN, the terminal device first sends the uplink data packet to the UPF network element. Then, the UPF network element forwards the uplink data packet to the switch such that the switch forwards the uplink data packet to the corresponding application server. In an uplink process, the switch may learn a media access control (MAC) address table of the terminal device. When the switch receives a downlink data packet sent by the application server, the switch may send the downlink data packet to the corresponding UPF network element based on the learned MAC address table, and the UPF network element sends the downlink data packet to the terminal device.

However, when the application server in the LAN actively sends the downlink data packet to the terminal device, if the switch has not learned the MAC address table, the switch cannot forward the downlink data packet to the correct UPF network element, resulting in a loss of downlink data. Alternatively, when a location of the terminal device changes, a UPF network element accessed by the terminal device may change. After the UPF network element accessed by the terminal device changes, the switch still sends, based on the original learned MAC address table, the downlink data packet to the UPF network element accessed by the terminal device before the terminal device is moved, but the UPF network element accessed by the terminal device before the terminal device is moved cannot send the downlink data packet to the terminal device. Consequently, the downlink data is lost, and data transmission reliability is relatively low.

SUMMARY

This application provides a data processing method and apparatus, and a device, to improve data transmission reliability.

According to a first aspect, this application provides a data processing method. A session management function (SMF) network element obtains, from an external network element, a MAC address of a terminal device and an Internet Protocol (IP) address corresponding to the MAC address. A first UPF network element sends the MAC address and the IP address, where the MAC address and the IP address are used to send an Address Resolution Protocol (ARP) message, and the ARP message includes the MAC address and the IP address.

In the foregoing process, the SMF network element may obtain the MAC address and the IP address of the terminal device from the external network element, and send the MAC address and the IP address of the terminal device to the first UPF network element such that the first UPF network element can send the ARP message based on the MAC address and the IP address of the terminal device. After the ARP message arrives at a switch in a LAN, the switch may learn a MAC address table of the terminal device in a process of processing the ARP message. In this way, even if an application server in the LAN actively sends downlink data to the terminal device, or the terminal device accesses a new UPF network element after the terminal device moves, the switch can still learn a latest MAC address table based on the received ARP message, and send the downlink data to a correct UPF network element based on the learned MAC address table. The UPF network element forwards the downlink data to the terminal device. Therefore, a loss of downlink data is avoided, thereby improving data transmission reliability.

In a possible design, the SMF network element may obtain the MAC address and the IP address of the terminal device in at least the following two feasible implementations.

In a possible implementation, the SMF network element obtains the MAC address and the IP address from a server.

In a possible design, before obtaining the MAC address and the IP address from the server, the SMF network element may further send a first request message to the server, where the first request message is used to request to obtain the MAC address of the terminal device and the IP address of the terminal device.

In a possible design, the server is a data network Authentication, Authorization, and Accounting (DN-AAA) server.

In this possible implementation, because the IP address of the terminal device is usually assigned by the DN-AAA server, the SMF network element may obtain a latest IP address of the terminal device from the DN-AAA server in time.

In another possible implementation, the SMF network element receives the IP address and the MAC address from a second UPF network element, where the first UPF network element is a UPF network element selected by the terminal device after the terminal device moves, and the second UPF network element is a UPF network element selected by the terminal device before the terminal device is moved.

In a possible design, the MAC address and the IP address are further used to generate the ARP message. For example, the first UPF network element may generate the ARP message based on the MAC address and the IP address, and send the generated ARP message.

In a possible design, the SMF network element generates the ARP message, and sends the ARP message including the MAC address and the IP address to the first UPF network element. For example, after receiving the ARP message including the MAC address and the IP address, the first UPF network element may forward the ARP message.

According to a second aspect, this application provides a data processing method. A first UPF network element receives, from an SMF network element, a MAC address and an IP address corresponding to the MAC address, and sends an ARP message based on the MAC address and the IP address, where the ARP message includes the MAC address and the IP address.

In the foregoing process, the first UPF network element may receive the MAC address and the IP address of a terminal device from the SMF network element, and send the ARP message based on the MAC address and the IP address of the terminal device. After the ARP message arrives at a switch in a LAN, the switch may learn a MAC address table of the terminal device in a process of processing the ARP message. In this way, even if an application server in the LAN actively sends downlink data to the terminal device, or the terminal device accesses a new UPF network element after the terminal device moves, the switch can still learn a latest MAC address table based on the received ARP message, and send the downlink data to a correct UPF network element based on the learned MAC address table. The UPF network element forwards the downlink data to the terminal device. Therefore, a loss of downlink data is avoided, thereby improving data transmission reliability.

In a possible design, the first UPF network element may generate the ARP message based on the MAC address and the IP address, and send the ARP message. In this possible design, the first UPF network element generates the ARP message, and sends the generated ARP message.

In a possible design, the first UPF network element may receive the ARP message including the MAC address and the IP address from the SMF network element, and forward the ARP message. In this possible design, the SMF network element generates the ARP message, and sends the ARP message to the first UPF network element, and the first UPF network element is responsible for forwarding the received ARP message.

According to a third aspect, this application provides a data processing apparatus. The apparatus includes an obtaining module and a sending module, where the obtaining module is configured to obtain, from an external network element, a MAC address of a terminal device and an IP address corresponding to the MAC address, and the sending module is configured to send the MAC address and the IP address to a first UPF network element, where the MAC address and the IP address are used to send an ARP message, and the ARP message includes the MAC address and the IP address.

In a possible design, the obtaining module is further configured to obtain the MAC address and the IP address from a server.

In a possible design, before the obtaining module obtains the MAC address and the IP address from the server, the sending module is further configured to send a first request message to the server, where the first request message is used to request to obtain the MAC address of the terminal device and the IP address of the terminal device.

In a possible design, the server is a DN-AAA server.

In a possible design, the obtaining module is further configured to receive the IP address and the MAC address from a second UPF network element, where the first UPF network element is a UPF network element selected by the terminal device after the terminal device moves, and the second UPF network element is a UPF network element selected by the terminal device before the terminal device is moved.

In a possible design, the MAC address and the IP address are further used to generate the ARP message.

In a possible design, the apparatus further includes a generation module, where the generation module is configured to generate the ARP message, and the sending module is further configured to send the ARP message including the MAC address and the IP address to the first UPF network element.

The data processing apparatus provided in this application may perform the method shown in any possible design of the first aspect. Their implementation principles and beneficial effects are similar, and details are not described herein again.

According to a fourth aspect, this application provides a data processing apparatus. The apparatus includes a receiving module and a sending module, where the receiving module is configured to receive, from a SMF network element, a MAC address and an IP address corresponding to the MAC address, and the sending module is configured to send an ARP message based on the MAC address and the IP address, where the ARP message includes the MAC address and the IP address.

In a possible design, the apparatus further includes a generation module, where the generation module is configured to generate the ARP message based on the MAC address and the IP address, and the sending module is further configured to send the ARP message.

In a possible design, the receiving module is further configured to receive the ARP message from the SMF network element, where the ARP message includes the MAC address and the IP address, and the sending module is further configured to forward the ARP message.

The data processing apparatus provided in this application may perform the method shown in any possible design of the second aspect. Their implementation principles and beneficial effects are similar, and details are not described herein again.

According to a fifth aspect, this application provides an SMF network element. The SMF network element includes a processor, a memory, and a communications bus, where the communications bus is configured to implement a connection between components, the memory is configured to store a program instruction, and the processor is configured to read the program instruction in the memory, and perform the method according to any possible design of the first aspect according to the program instruction in the memory.

According to a sixth aspect, this application provides a UPF network element. The UPF network element includes a processor, a memory, and a communications bus, where the communications bus is configured to implement a connection between components, the memory is configured to store a program instruction, and the processor is configured to read the program instruction in the memory, and perform the method according to any possible design of the second aspect according to the program instruction in the memory.

According to a seventh aspect, this application provides a computer-readable storage medium. The computer-readable storage medium stores an instruction, and when the instruction is run on a computer, the computer is enabled to perform the method shown in any one of the foregoing method embodiments.

According to an eighth aspect, this application provides a computer program product. The computer program product includes a computer-executable instruction, where the computer-executable instruction is stored in a computer-readable storage medium. At least one processor may read the computer-executable instruction from the computer-readable storage medium, and execute the computer-executable instruction to perform the data processing method shown in any one of the foregoing method embodiments.

According to a ninth aspect, this application provides a chip system. The chip system includes a processor configured to support implementation of a function in any one of the foregoing method embodiments, for example, generating or processing data and/or information in the foregoing methods.

In a possible design, the chip system further includes a memory. The memory is configured to store a necessary program instruction and necessary data. The chip system may include a chip, or may include a chip and another discrete device.

According to the data processing method and apparatus, and the device that are provided in this application, the SMF network element may obtain the MAC address and the IP address of the terminal device from the external network element, and send the MAC address and the IP address of the terminal device to the first UPF network element such that the first UPF network element can send the ARP message based on the MAC address and the IP address. After the ARP message arrives at the switch in the LAN, the switch may learn the corresponding MAC address table in the process of processing the ARP message. In this way, even if the application server in the LAN actively sends the downlink data to the terminal device, or the terminal device accesses the new UPF network element after the terminal device moves, the switch can still learn the latest MAC address table based on the received ARP message, and send the downlink data to the correct UPF network element based on the learned MAC address table. The UPF network element forwards the downlink data to the terminal device. Therefore, the loss of the downlink data is avoided, thereby improving the data transmission reliability.

DESCRIPTION OF EMBODIMENTS

Figure 1:
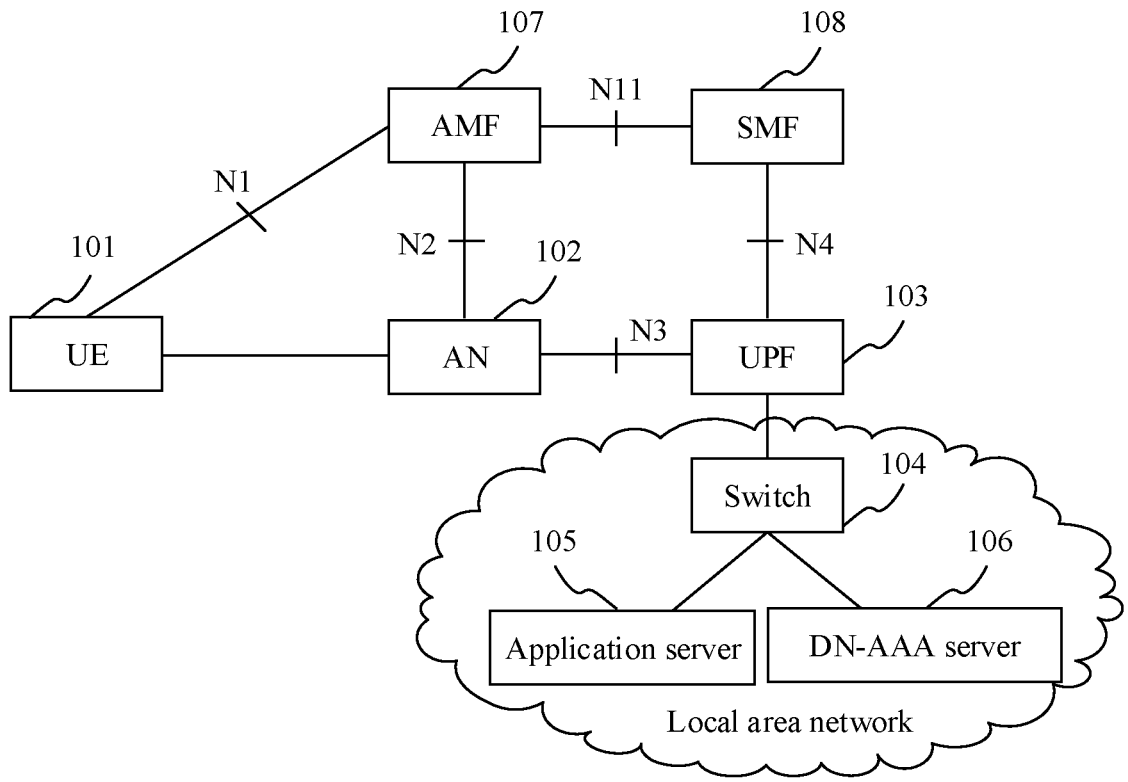
FIG. 1 is an architectural diagram of a communications system according to this application.

FIG. 1 is an architectural diagram of a communications system according to this application. Referring to FIG. 1, the communications system may include a terminal device (e.g., a user equipment (UE)) 101, an access network (AN) node 102, a UPF network element 103, an access and mobility management function (AMF) network element 107, and an SMF network element 108. The UPF 103 may be connected to a LAN. The LAN includes a switch 104, an application server 105, and a DN-AAA server 106. The DN-AAA server 106 may be a network element in the LAN, or may be a network element in a fifth generation (5G) network.

Optionally, the UE 101 may be a mobile phone (or referred to as a "cellular" phone) or a computer having a mobile terminal, for example, may be a portable, pocket-sized, handheld, computer-embedded, or vehicle-mounted mobile apparatus. In addition, the UE may also be referred to as a mobile station (MS), a terminal, or a terminal device (terminal equipment). This is not limited in this application.

The AN node 102 may be a device providing wireless access for a terminal device, and includes but is not limited to an evolved NodeB (eNB), a WI-FI access point (WI-FI AP), and a Worldwide Interoperability for Microwave Access (WIMAX) base station (WIMAX BS), a base station (for example, a gNodeB or a gNB) in a 5G network, or the like.

The UPF network element 103 is configured to process a packet, for example, forward the packet and collect statistics about the packet. The UPF network element 103 further completes execution of a session-related policy according to an instruction of the SMF network element 108.

The switch 104 is configured to forward a packet. For example, the switch 104 may forward a packet received from the UPF network element 103 to the corresponding application server 105, and forward a packet received from the application server 105 to the corresponding UPF network element 103.

The application server 105 is configured to provide a service data service for the UE 101.

The DN-AAA server 106 is configured to provide services such as authentication and authorization for session establishment.

The AMF network element 107 is configured to forward a message exchanged between the SMF network element 108 and the UE 101, and is further configured to be responsible for mobility management, such as user location update, registration of a user with a network, and user switching, in a mobile network.

The SMF network element 108 is mainly responsible for session management, such as session establishment, session modification, and session release, in a mobile network.

The foregoing network elements may be network elements implemented on dedicated hardware, or may be software instances run on dedicated hardware, or may be instances of virtualization functions on a proper platform. For example, the foregoing virtualization platform may be a cloud platform.

In this application, an SMF network element may obtain, from an external network element, a MAC address of the terminal device and an IP address corresponding to the MAC address, and send the MAC address and the IP address of the terminal device to a UPF network element such that the UPF network element sends an ARP message to a switch in a LAN. After the ARP message arrives at the switch in the LAN, the switch may learn a corresponding MAC address table in a process of processing the ARP message. In this way, even if an application server actively sends downlink data to the terminal device, or the terminal device accesses a new UPF network element after the terminal device moves, the switch can still send the downlink data to a correct UPF network element based on a learned MAC address. The UPF network element forwards the downlink data to the terminal device. Therefore, a loss of downlink data is avoided, thereby improving data transmission reliability.

Specific embodiments are used below to describe the technical solutions of this application in detail. It should be noted that the following several specific embodiments may be combined with each other, and same or similar content is not repeatedly described in different embodiments.

Figure 2:
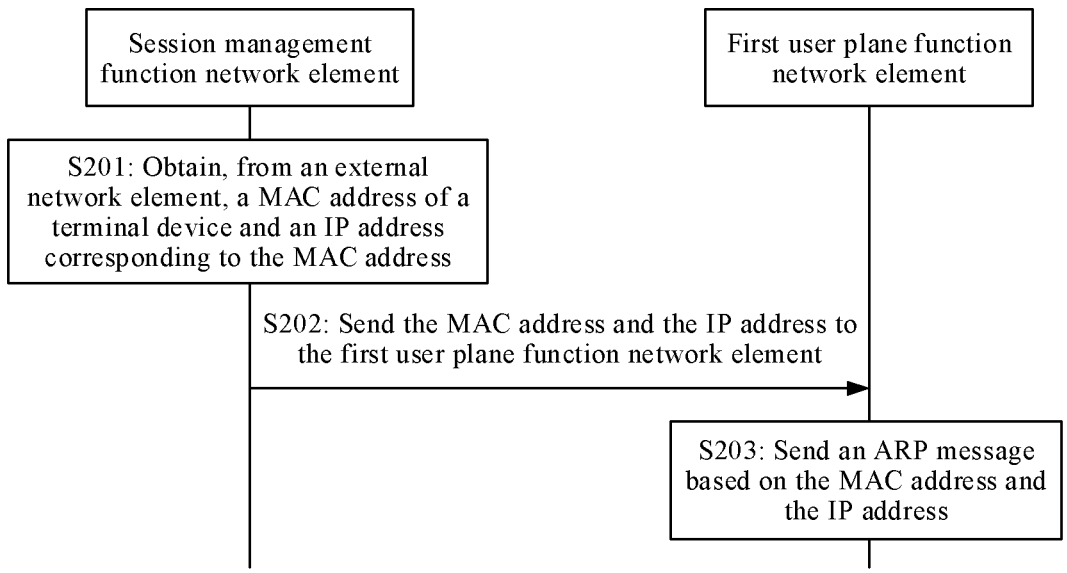
FIG. 2 is a first schematic flowchart of a data processing method according to this application.

FIG. 2 is a first schematic flowchart of a data processing method according to this application. Referring to FIG. 2, the method may include the following steps.

S201: A session management function (i.e., SMF) network element obtains, from an external network element, a MAC address of a terminal device and an IP address corresponding to the MAC address.

Optionally, the SMF network element may be the SMF network element 108 in the embodiment shown in FIG. 1.

Optionally, the external network element may be a server. For example, the server is a DN-AAA server (for example, the DN-AAA server 106 in the embodiment shown in FIG. 1). The external network element may alternatively be a UPF network element.

Certainly, the external network element may alternatively be another network element, provided that the external network element stores a correspondence between a MAC address and an IP address of the terminal device or a correspondence between a MAC address and an IP address of the terminal device is detected from the external network element. The external network element is not limited in this application.

The following uses an example in which the external network element is a DN-AAA server to describe in detail a process in which the SMF network element obtains, from the external network element, the MAC address of the terminal device and the IP address corresponding to the MAC address.

In a process in which the terminal device requests the SMF network element to establish a session, the DN-AAA server needs to authenticate the session. In a session authentication process of the DN-AAA server, the DN-AAA server assigns an IP address to the terminal device, and stores the correspondence between a MAC address and an IP address of the terminal device.

Optionally, after assigning the IP address to the terminal device, the DN-AAA server may send the MAC address and the IP address of the terminal device to the SMF network element.

Optionally, when the SMF network element needs to use the MAC address and the IP address of the terminal device, the SMF network element may send a first request message to the external network element, to request to obtain the MAC address and the IP address of the terminal device from the external network element. For example, when the SMF network element needs to send an ARP message corresponding to the terminal device, or when the SMF network element receives a request message from another network element (for example, a first UPF network element), the SMF network element requests to obtain the MAC address and the IP address of the terminal device from the external network element. Certainly, the SMF network element may alternatively request, in another scenario, to obtain the MAC address and the IP address of the terminal device from the external network element. This is not limited in this application.

S202: The SMF network element sends the MAC address and the IP address to the first user plane function (i.e., UPF) network element.

Optionally, the first UPF network element is a UPF network element currently providing a service for the terminal device. That is, the first UPF network element is a UPF network element currently accessed by the terminal device. For example, the first UPF network element may be the UPF network element 103 in the embodiment shown in FIG. 1.

Optionally, after obtaining the MAC address and the IP address of the terminal device, the SMF network element may send the MAC address and the IP address of the terminal device to the first UPF network element. Alternatively, the SMF network element may send the MAC address and the IP address of the terminal device to the first UPF network element after receiving a request message sent by the first UPF network element. A moment at which the SMF network element sends the MAC address and the IP address to the first UPF network element is not limited in this application.

Optionally, the SMF network element may send the MAC address and the IP address to the first UPF network element, where the MAC address and the IP address are used to generate the ARP message. Alternatively, the SMF network element may send the ARP message to the first UPF network element, and add the MAC address and the IP address of the terminal device to the ARP message.

S203: The first UPF network element sends the ARP message based on the MAC address and the IP address.

The ARP message includes the MAC address and the IP address.

Optionally, the ARP message may be an ARP acknowledgment.

Optionally, when the first UPF network element directly receives the MAC address and the IP address, and the first UPF network element has an ARP proxy function, the first UPF network element may generate the ARP message based on the MAC address and the IP address, and send the generated ARP message. The ARP message includes the MAC address and the IP address of the terminal device.

Optionally, that a network element has an ARP proxy function means that the network element has a function of sending an ARP message in place of another network element, where the ARP message includes a MAC address and an IP address of the other network element, that is, a source IP address in the ARP message is an IP address of the other network element, and a source MAC address in the ARP message is a MAC address of the other network element.

Optionally, when a destination address in an ARP request message received by the network element is an address of another network element, the network element sends an ARP acknowledgment in place of the other network element. When the network element receives a MAC address and an IP address of another network element, the network element sends an ARP message in place of the other network element. In this case, the ARP message may be a gratuitous ARP packet.

For example, when the first UPF network element has the ARP proxy function, the first UPF network element may send the ARP message in place of the terminal device, and the ARP message carries the MAC address and the IP address of the terminal device (that is, the source MAC address in the ARP message is the MAC address of the terminal device, and a source IP address in the ARP message is the IP address of the terminal device). When receiving the ARP request message sent to the terminal device, the first UPF network element sends the ARP acknowledgment in place of the terminal device. When receiving the IP address and the MAC address of the terminal device, the first UPF network element sends the ARP message in place of the terminal device.

Optionally, when receiving the ARP message carrying the MAC address and the IP address, the first UPF network element forwards the received ARP message.

It should be noted that after the first user plane sends the ARP message, the ARP message first arrives at a switch in a LAN. Because the ARP message is uplink data, the switch may learn a latest MAC address table based on the ARP message. For a process in which the switch learns the MAC address table based on the uplink data, refer to other approaches. Details are not described in this application.

It should be further noted that, before the embodiment shown in FIG. 2 is performed, the SMF network element may determine whether a data packet exchanged between the UPF network element and the switch is an Ethernet data packet. When the SMF network element determines that the data packet mutually sent between the UPF network element and the switch is an Ethernet data packet, the SMF network element instructs the UPF network element to detect whether the Ethernet data packet is an IP-type data packet. When the UPF network element detects that the Ethernet data packet is an IP-type data packet, the embodiment shown in FIG. 2 is performed. For example, the UPF network element may determine whether the Ethernet data packet includes an IP address, and if the Ethernet data packet includes the IP address, determine that the Ethernet data packet is an IP-type data packet, or if the Ethernet data packet does not include the IP address, determine that the Ethernet data packet is a non-IP-type data packet.

According to the data processing method provided in this application, the SMF network element may obtain the MAC address and the IP address of the terminal device from the external network element, and send the MAC address and the IP address of the terminal device to the first UPF network element such that the first UPF network element can send the ARP message based on the MAC address and the IP address. After the ARP message arrives at the switch in the LAN, the switch may learn the corresponding MAC address table in the process of processing the ARP message. In this way, even if an application server in the LAN actively sends downlink data to the terminal device, or the terminal device accesses a new UPF network element after the terminal device moves, the switch can still learn a latest MAC address table based on the received ARP message, and send the downlink data to the correct UPF network element based on the learned MAC address table. The UPF network element forwards the downlink data to the terminal device. Therefore, a loss of downlink data is avoided, thereby improving data transmission reliability.

Based on any one of the foregoing embodiments, in an actual application process, interaction processes of learning a latest MAC address table by a switch are different in different scenarios. With reference to the embodiments shown in FIG. 3A to FIG. 6B, the following describes in detail processes of learning a latest MAC address table by a switch in different scenarios.

In the embodiments shown in FIG. 3A to FIG. 4B, an application scenario includes when an application server in a LAN actively delivers downlink data, a switch learns a latest MAC address table.

In the embodiments shown in FIG. 5A to FIG. 6B, an application scenario includes when a terminal device is moved and selects a new UPF network element, the switch learns a latest MAC address table. A service and session continuity (SSC) mode of a session in the embodiments in FIG. 5A to FIG. 6B is an SSC mode 2. To be specific, when re-establishing a session, the terminal device first releases an original session, and then establishes a new session.

Figure 3A:
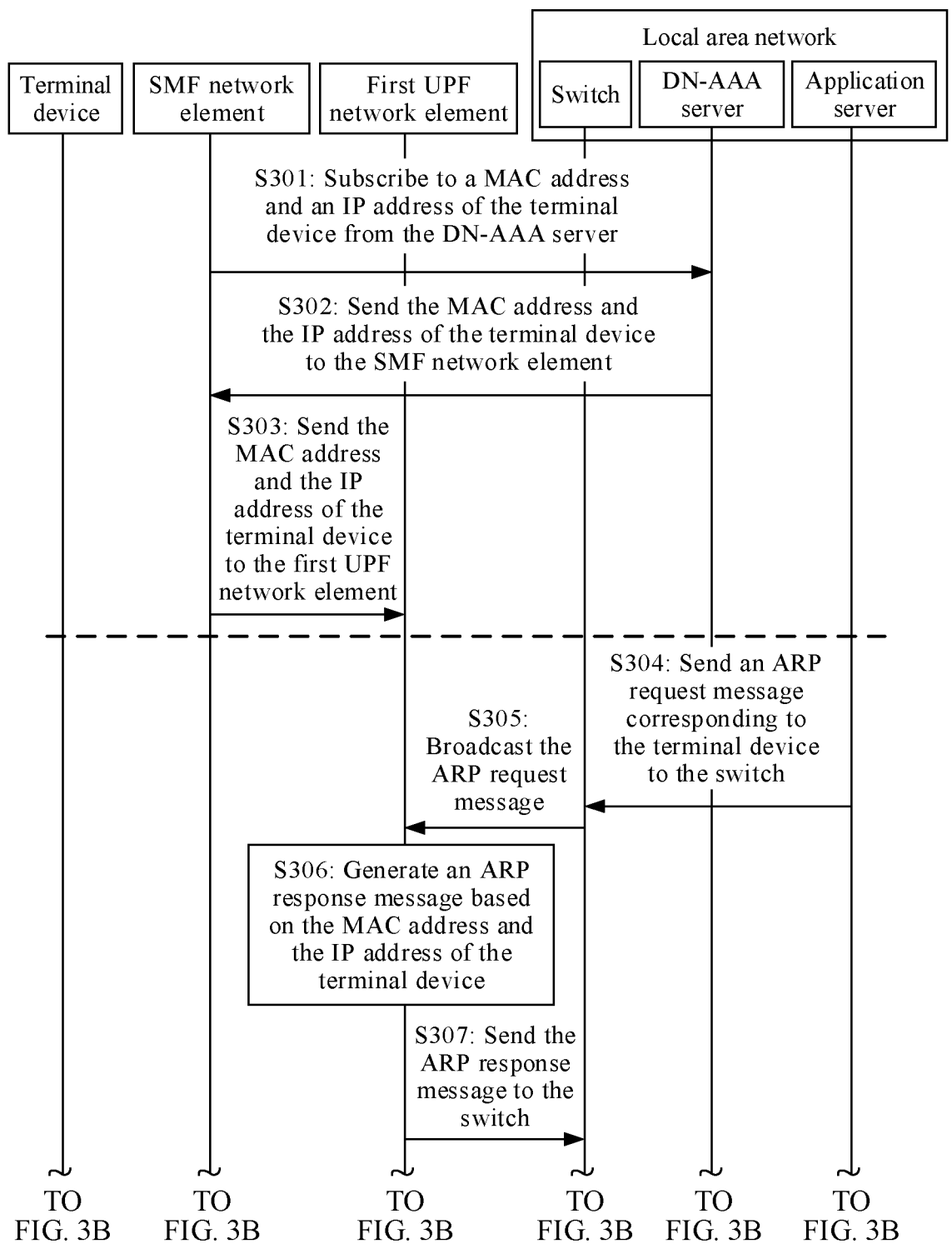
FIG. 3A and FIG. 3B are a second schematic flowchart of a data processing method according to this application.
Figure 3B:
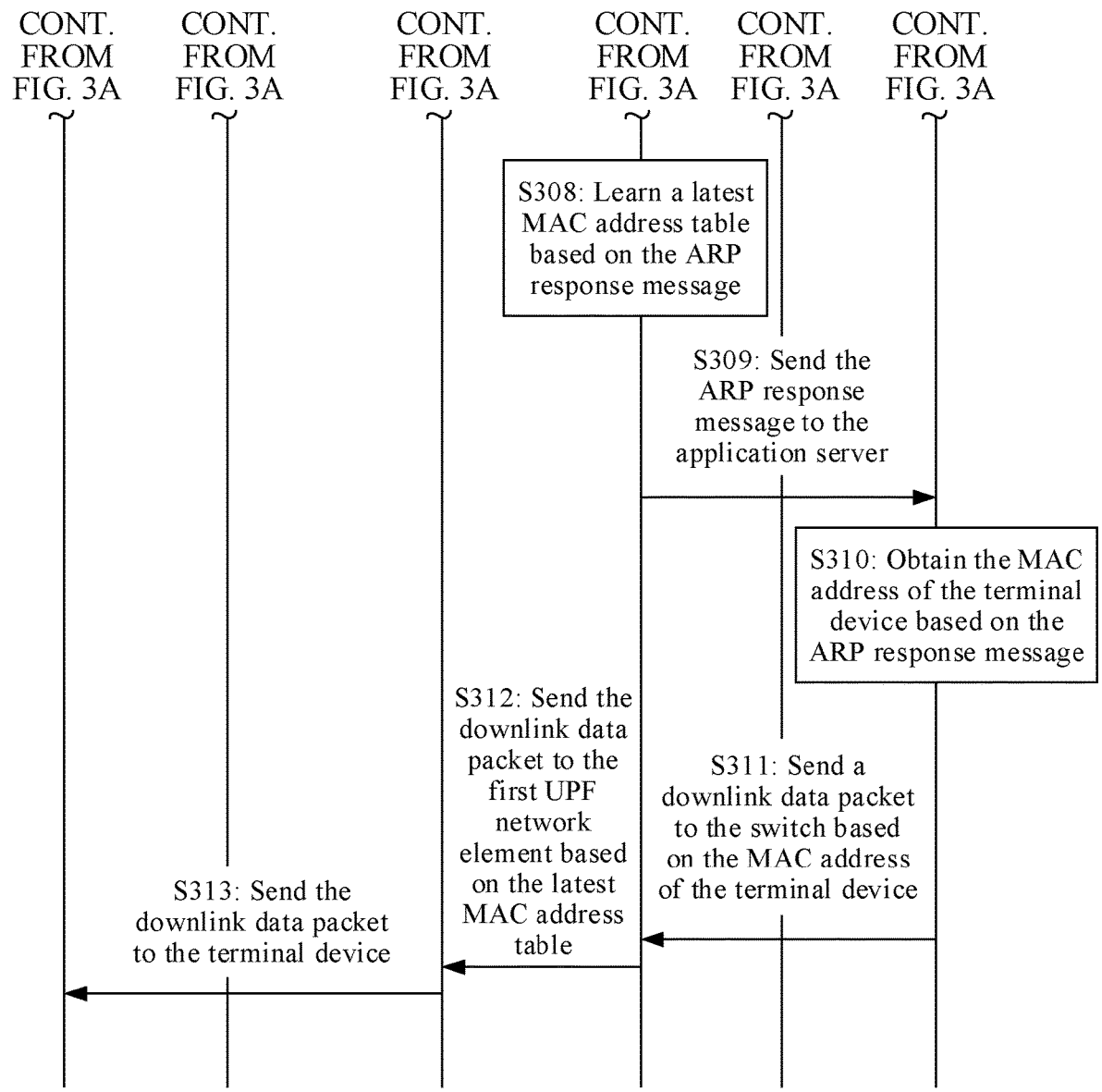

FIG. 3A and FIG. 3B are a second schematic flowchart of a data processing method according to this application. In the embodiment shown in FIG. 3A and FIG. 3B, an example in which an SMF network element and a UPF network element is used for description, and a first UPF network element has an ARP proxy function. Referring to FIG. 3A and FIG. 3B, the method may include the following steps.

S301: An SMF network element subscribes to a MAC address and an IP address of a terminal device from a DN-AAA server.

After the SMF network element subscribes to the MAC address and the IP address of the terminal device from the DN-AAA server, and the DN-AAA server assigns the IP address to the terminal device, the DN-AAA server actively sends the MAC address and the IP address of the terminal device to the SMF network element.

Optionally, the AMF server may subscribe to the MAC address and the IP address of the terminal device from the DN-AAA server by invoking a service.

It should be noted that before S301, the SMF network element may first determine that a data packet exchanged between a UPF network element and a switch is an Ethernet data packet, and a first UPF network element determines that the Ethernet data packet is an IP-type data packet.

S302: The DN-AAA server sends the MAC address and the IP address of the terminal device to the SMF network element.

Optionally, in a process of establishing a session of the terminal device, when authenticating the session of the terminal device, the DN-AAA server may assign a new IP address to the terminal device. After assigning the new IP address to the terminal device, the DN-AAA server may send the MAC address and the IP address of the terminal device to the SMF network element based on subscription of the SMF network element.

Optionally, after the SMF network element sends a subscription request to the DN-AAA server once, the MAC address and the IP address of the terminal device may be sent to the SMF network element provided that the DN-AAA server assigns the new IP address to the terminal device.

S303: The SMF network element sends the MAC address and the IP address of the terminal device to the first UPF network element.

The first UPF network element is a UPF network element currently serving the terminal device.

Optionally, before S303, the first UPF network element may further send a request message to the SMF network element, and add an identifier of the terminal device to the request message. The SMF network element may send the MAC address and the IP address of the terminal device to the first UPF network element based on the request message.

Optionally, S303 may be performed after S302. To be specific, the SMF network element may send the MAC address and the IP address of the terminal device to the first UPF network element after obtaining the MAC address and the IP address of the terminal device.

Optionally, the SMF network element may alternatively perform S303 after receiving the request message sent by the first UPF network element. For example, the first UPF network element may send the request message to the SMF network element after receiving an ARP request message (S305), where the request message is used to request to obtain the MAC address and the IP address of the terminal device from the SMF network element.

It should be noted that S303 may alternatively be performed at another moment. To be specific, the SMF network element may further send the MAC address and the IP address of the terminal device to the first UPF network element at another moment. An execution moment of S303 is not limited in this application.

The first UPF network element may obtain the MAC address and the IP address of the terminal device by performing S301 to S303. Certainly, the first UPF network element may alternatively obtain the MAC address and the IP address of the terminal device in another feasible implementation. This is not limited in this application.

S304: An application server sends the ARP request message corresponding to the terminal device to the switch.

A source IP address in the ARP request message is an IP address of the application server, and a destination IP address in the ARP request message is an IP address of the terminal device. A source MAC address in the ARP request message is a MAC address of the application server, and a destination MAC address in the ARP request message is a broadcast destination MAC address. For example, the broadcast destination MAC address may be FFFF-FFFF-FFFF.

Optionally, the application server may send the ARP request message to the switch when the application server needs to actively send downlink data to the terminal device.

S305: The switch broadcasts the ARP request message.

After the switch broadcasts the ARP request message, the UPF network element connected to the switch may receive the ARP request message.

After receiving the ARP Request message, the switch can learn a MAC address table. For example, assuming that the switch receives the ARP request message through a port 1, the MAC address table that may be learned by the switch based on the ARP request message is shown in Table 1.

TABLE 1

| MAC address table | |
|---|---|
| MAC address | Port number |
| MAC address of the application server | Port 1 |

It should be noted that Table 1 shows the MAC address table only in an example form, and does not limit a format of the MAC address table and content included in the MAC address table.

S306: The first UPF network element generates an ARP response message based on the MAC address and the IP address of the terminal device.

The ARP response message includes the IP address and the MAC address of the terminal device.

A source IP address in the ARP response message is the IP address of the terminal device, and a destination IP address in the ARP response message is the IP address of the application server. A source MAC address in the ARP response message is the MAC address of the terminal device, and a destination MAC address in the ARP response message is the MAC address of the application server.

It should be noted that after at least one UPF network element receives the ARP request message, only a UPF network element that can obtain the MAC address and the IP address of the terminal device can generate the ARP response message. Only a UPF network element serving the terminal device can obtain the MAC address and the IP address of the terminal device. Therefore, after the switch broadcasts the ARP request message, only a first UPF network element that provides a service for the terminal device and that has an ARP proxy function can generate the ARP response message.

It should be further noted that if the SMF network element does not send the MAC address and the IP address of the terminal device to the first UPF network element (that is, does not perform S303) after obtaining the MAC address and the IP address of the terminal device, before S306, the first UPF network element may further request to obtain the MAC address and the IP address of the terminal device from the SMF network element.

S307: The first UPF network element sends the ARP response message to the switch.

A source IP address in the ARP response message is the IP address of the terminal device, and a destination IP address in the ARP response message is the IP address of the application server. A source MAC address in the ARP response message is the MAC address of the terminal device, and a destination MAC address in the ARP response message is the MAC address of the application server.

S308: The switch learns a latest MAC address table based on the ARP response message.

It is assumed that the first UPF network element is connected to the switch through a port 2. The switch receives the ARP response message through the port 2. Because the source MAC address in the ARP response message is the MAC address of the terminal device, based on the MAC address table shown in Table 1, the switch may learn the MAC address table shown in Table 2.

TABLE 2

| MAC address table | |
|---|---|
| MAC address | Port number |
| MAC address of the application server | Port 1 |
| MAC address of the terminal device | Port 2 |

It can be learned from Table 2 that when the switch receives, through the port 1, a downlink packet (in which a source MAC address is the MAC address of the application server, and a destination MAC address is the MAC address of the terminal device) sent by the application server to the terminal device, the switch may forward the packet to the first UPF through the port 2 based on the MAC address table shown in Table 2. When the switch receives, through the port 2, an uplink packet (in which a source MAC address is the MAC address of the terminal device, and a destination MAC address is the MAC address of the application server) sent by the terminal device to the application server, the switch may forward the packet to the application server through the port 1 based on the MAC address table shown in Table 2.

It should be noted that Table 2 shows the MAC address table only in an example form, and does not limit a format and content of the MAC address table.

It should be noted that the switch may learn the latest MAC address table by performing S304 to S308. Certainly, the switch may alternatively learn the latest MAC address table using another interaction procedure. This is not limited in this application.

S309: The switch sends the ARP response message to the application server.

S310: The application server obtains the MAC address of the terminal device based on the ARP response message.

The application server may obtain the MAC address of the terminal device by performing S309 and S310. In this way, the application server can successfully send a downlink data packet to the terminal device.

S311: The application server sends the downlink data packet to the switch based on the MAC address of the terminal device.

A destination MAC address in the downlink data packet is the MAC address of the terminal device.

S312: The switch sends the downlink data packet to the first UPF network element based on the latest learned MAC address table.

For example, referring to Table 2, after receiving, through the port 1, the downlink data packet sent by the application server to the terminal device, the switch may determine, based on the MAC address table, to send the downlink data packet through the port 2 such that the downlink data packet can be sent to the first UPF network element.

S313: The first UPF network element sends the downlink data packet to the terminal device.

In the embodiment shown in FIG. 3A and FIG. 3B, the SMF network element may obtain the MAC address and the IP address of the terminal device from the DN-AAA server, and the first UPF network element may obtain the MAC address and the IP address of the terminal device from the SMF network element. When the application server needs to actively send a downlink data packet to the terminal device, the application server may first send a broadcast ARP request message. After the first UPF network element receives the ARP request message, because the first UPF network element has the ARP proxy function and can obtain the MAC address and the IP address of the terminal device, the first UPF network element generates an ARP acknowledgment, and sends the ARP acknowledgment to the switch. The ARP acknowledgment is an uplink packet. Therefore, the switch may learn the latest MAC address table based on the ARP acknowledgment, and the switch may further send the ARP acknowledgment to the application server such that the application server obtains the MAC address of the terminal device from the ARP acknowledgment. After the application server obtains the MAC address of the terminal device, it can be ensured that the application server sends the downlink data packet to the terminal device based on the MAC address of the terminal device. Because the switch learns the latest MAC address table, after receiving the downlink data packet sent by the application server, the switch can forward the downlink data packet to a correct UPF network element such that the correct UPF network element can successfully forward the downlink data packet to the terminal device. Therefore, a loss of the downlink data packet is avoided, thereby improving data transmission reliability.

Figure 4A:
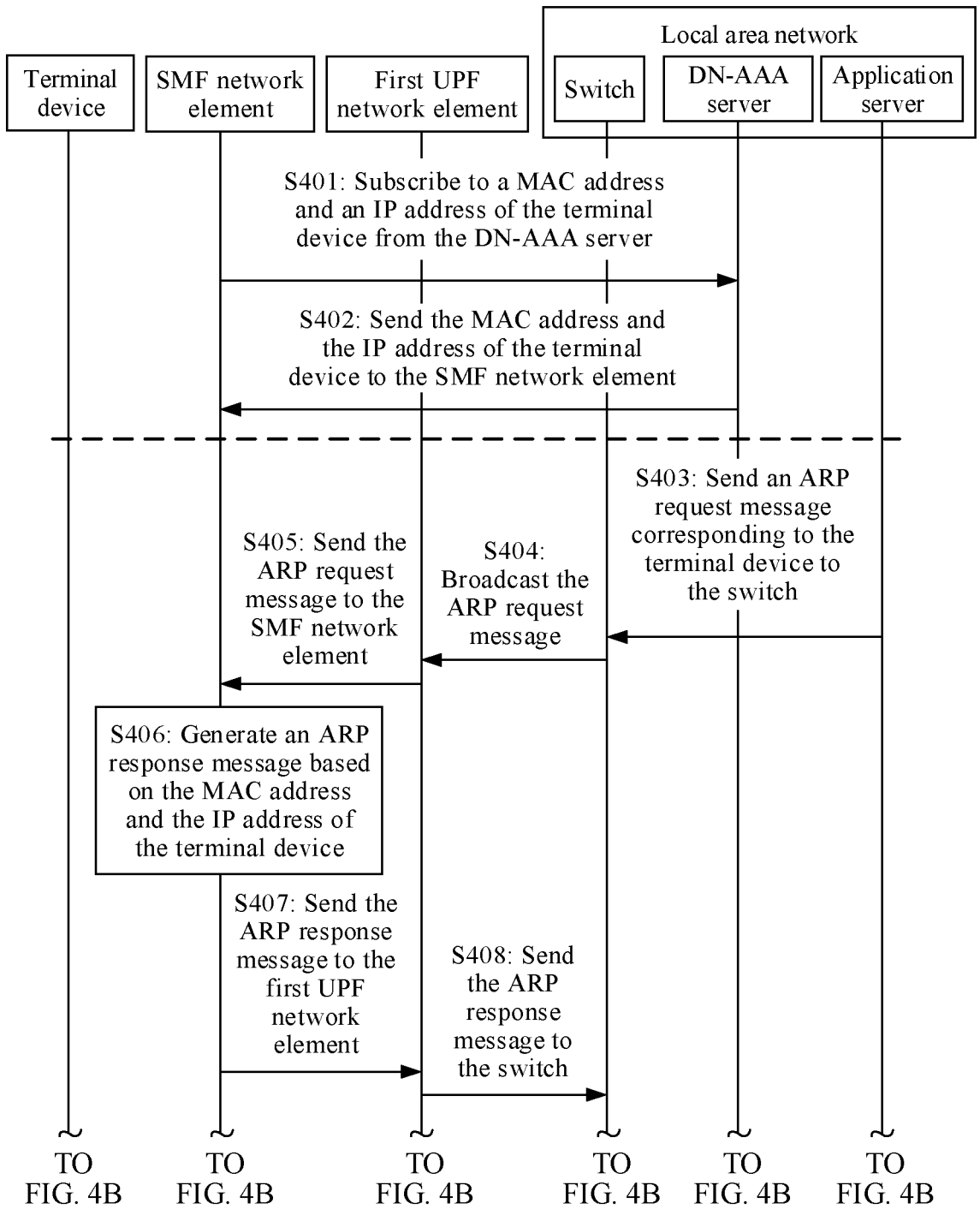
FIG. 4A and FIG. 4B are a third schematic flowchart of a data processing method according to this application.
Figure 4B:
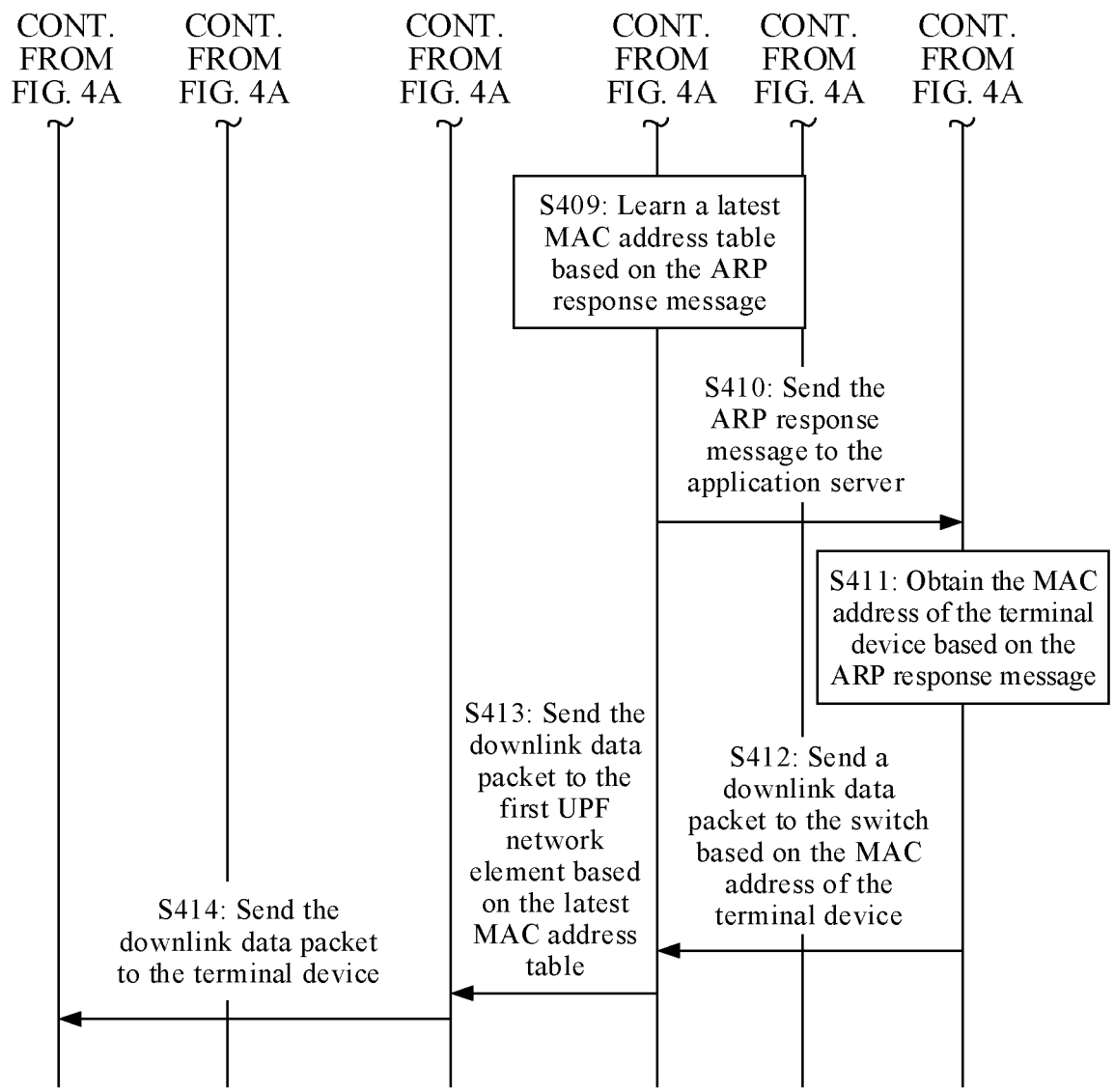

FIG. 4A and FIG. 4B are a third schematic flowchart of a data processing method according to this application. In the embodiment shown in FIG. 4A and FIG. 4B, an example in which an SMF network element and a UPF network element is used for description, and a first UPF network element does not have an ARP proxy function, and the SMF network element has the ARP proxy function. Referring to FIG. 4A and FIG. 4B, the method may include the following steps.

S401: An SMF network element subscribes to a MAC address and an IP address of a terminal device from a DN-AAA server.

S402: The DN-AAA server sends the MAC address and the IP address of the terminal device to the SMF network element.

It should be noted that for execution processes of S401 and S402, refer to S301 and S302. Details are not described herein again in this application.

S403: An application server sends an ARP request message corresponding to the terminal device to a switch.

S404: The switch broadcasts the ARP request message.

It should be noted that for execution processes of S403 and S404, refer to S304 and S305. Details are not described herein again in this application.

S405: A first UPF network element sends the ARP request message to the SMF network element.

It should be noted that after a plurality of UPF network elements receive the ARP request message, only the first UPF network element serving the terminal device processes the ARP request message. That is, only the first UPF network element sends the ARP request message to the SMF network element.

Because the first UPF network element does not have an ARP proxy function, the first UPF network element forwards the ARP request message after receiving the ARP request message.

S406: The SMF network element generates an ARP response message based on the MAC address and the IP address of the terminal device.

The ARP response message includes the IP address and the MAC address of the terminal device.

A source IP address in the ARP response message is the IP address of the terminal device, and a destination IP address in the ARP response message is the IP address of the application server. A source MAC address in the ARP response message is the MAC address of the terminal device, and a destination MAC address in the ARP response message is a MAC address of the application server.

S407: The SMF network element sends the ARP response message to the first UPF network element.

S408: The first UPF network element sends the ARP response message to the switch.

S409: The switch learns a latest MAC address table based on the ARP response message.

It should be noted that for an execution process of S409, refer to S308. Details are not described herein again in this application.

It should be noted that the switch may learn the latest MAC address table by performing S403 to S409. Certainly, the switch may alternatively learn the latest MAC address table using another interaction procedure. This is not limited in this application.

S410: The switch sends the ARP response message to the application server.

S411: The application server obtains the MAC address of the terminal device based on the ARP response message.

The application server may obtain the MAC address of the terminal device by performing S410 and S411. In this way, the application server can successfully send a downlink data packet to the terminal device.

S412: The application server sends the downlink data packet to the switch based on the MAC address of the terminal device.

A destination MAC address in the downlink data packet is the MAC address of the terminal device.

S413: The switch sends the downlink data packet to the first UPF network element based on the latest learned MAC address table.

S414: The first UPF network element sends the downlink data packet to the terminal device.

In the embodiment shown in FIG. 4A and FIG. 4B, the SMF network element may obtain the MAC address and the IP address of the terminal device from the DN-AAA server. When the application server needs to actively send a downlink data packet to the terminal device, the application server may first send a broadcast ARP request message. After the first UPF network element receives the ARP request message, because the first UPF network element does not have the ARP proxy function, the first UPF network element sends the ARP request message to the SMF network element. The SMF network element has the ARP proxy function and can obtain the MAC address and the IP address of the terminal device. Therefore, the SMF network element generates an ARP acknowledgment, and sends the ARP acknowledgment to the first UPF network element. The first UPF network element sends the ARP acknowledgment to the switch. The ARP acknowledgment is an uplink packet. Therefore, the switch may learn the latest MAC address table based on the ARP acknowledgment, and the switch may further send the ARP acknowledgment to the application server such that the application server obtains the MAC address of the terminal device from the ARP acknowledgment. After the application server obtains the MAC address of the terminal device, it can be ensured that the application server sends the downlink data packet to the terminal device based on the MAC address of the terminal device. Because the switch learns the latest MAC address table, after receiving the downlink data packet sent by the application server, the switch can forward the downlink data packet to a correct UPF network element such that the correct UPF network element can successfully forward the downlink data packet to the terminal device. Therefore, a loss of the downlink data packet is avoided, thereby improving data transmission reliability.

Figure 5A:
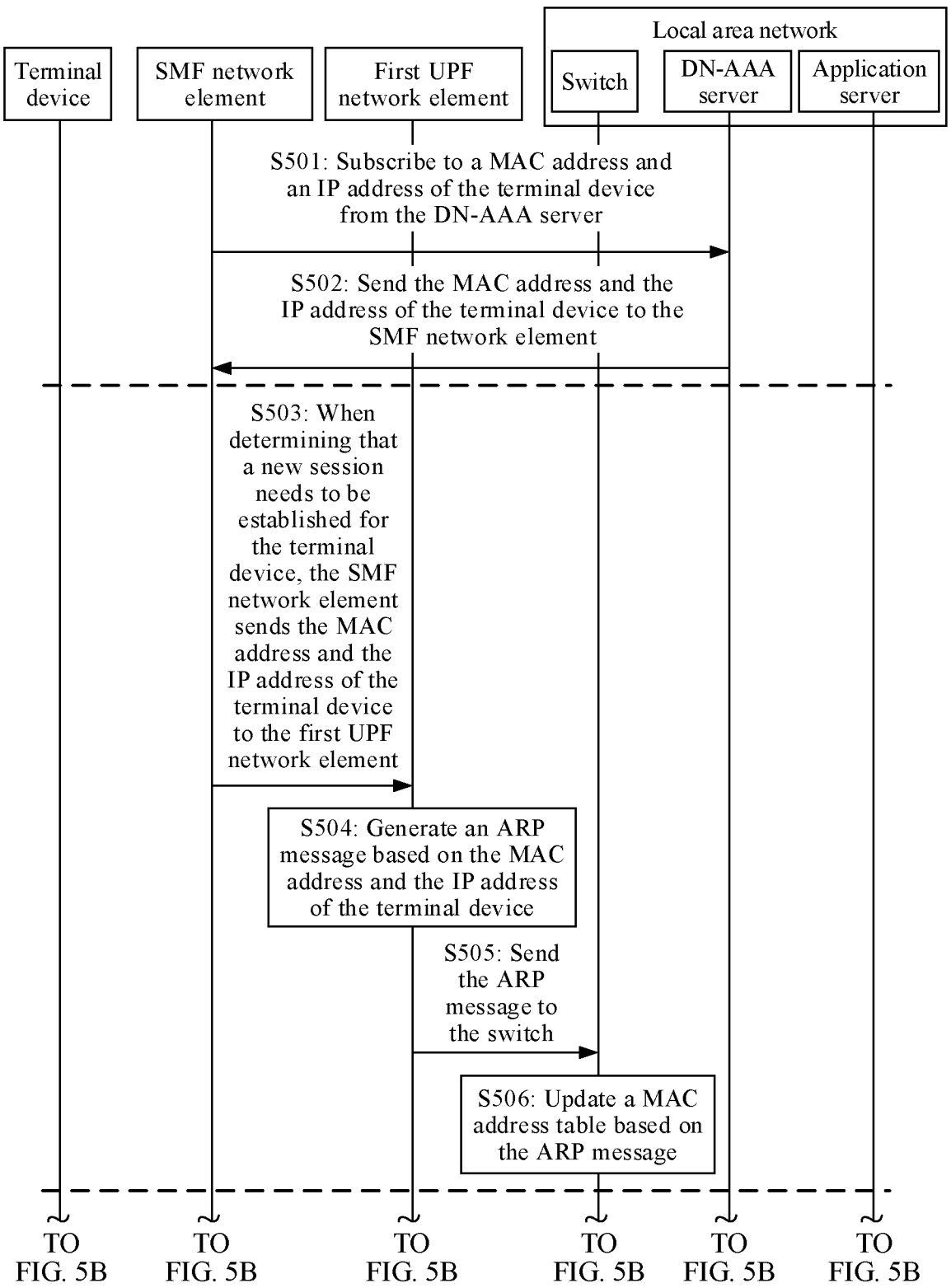
FIG. 5A and FIG. 5B are a fourth schematic flowchart of a data processing method according to this application.
Figure 5B:
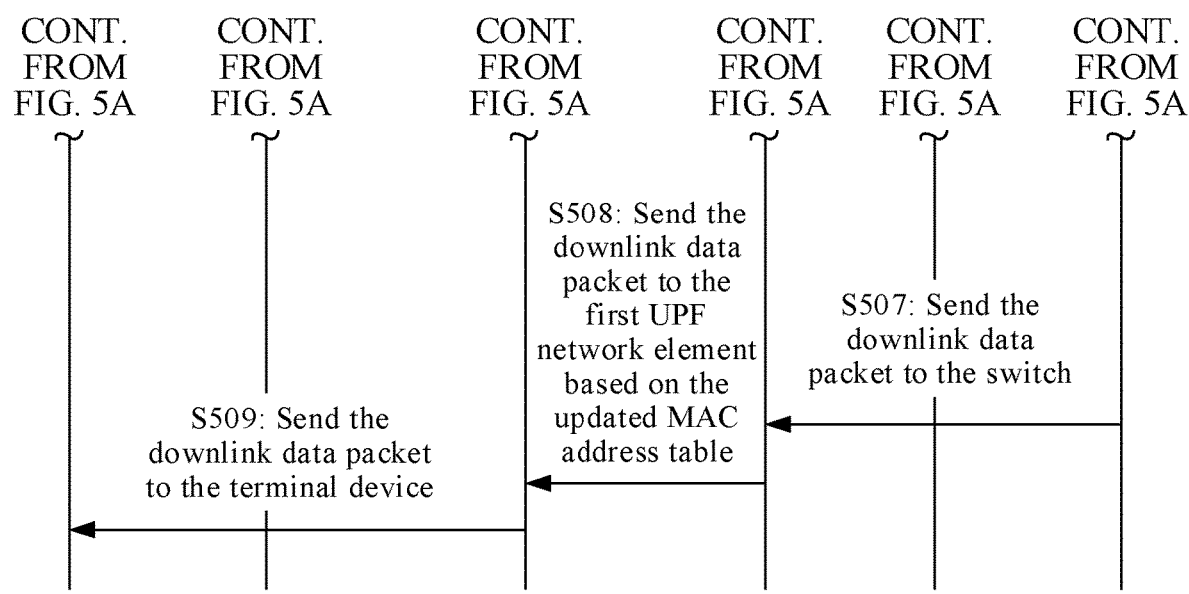

FIG. 5A and FIG. 5B are a fourth schematic flowchart of a data processing method according to this application. In the embodiment shown in FIG. 5A and FIG. 5B, an example in which an SMF network element and a UPF network element is used for description. It is assumed that a UPF network element selected by the terminal device before the terminal device is moved is a second UPF network element, a UPF network element selected by the terminal device after the terminal device moves is a first UPF network element, and the first UPF network element has an ARP proxy function. Referring to FIG. 5A and FIG. 5B, the method may include the following steps.

S501: An SMF network element subscribes to a MAC address and an IP address of a terminal device from a DN-AAA server.

S502: The DN-AAA server sends the MAC address and the IP address of the terminal device to the SMF network element.

It should be noted that for execution processes of S501 and S502, refer to S301 and S302. Details are not described herein again in this application.

S503: When a new session needs to be established for the terminal device, the SMF network element sends the MAC address and the IP address of the terminal device to a first UPF network element.

Optionally, after the terminal device moves, when the SMF network element detects that the terminal device is moved out of a service scope of an original UPF network element, the SMF network element selects a new UPF network element for the terminal device, and establishes a new session for the terminal device.

Certainly, the SMF network element may alternatively send the MAC address and the IP address of the terminal device to the first UPF network element when selecting a new first UPF network element for the terminal device.

Optionally, when a new session needs to be established for the terminal device, the SMF network element may first determine the first UPF network element currently serving the terminal device, and then send the MAC address and the IP address of the terminal device to the first UPF network element.

S504: The first UPF network element generates an ARP message based on the MAC address and the IP address of the terminal device.

Because the first UPF network element has an ARP proxy function, the first UPF network element generates the ARP message after receiving the MAC address and the IP address of the terminal device.

A destination IP address in the ARP message is the IP address of the terminal device, and a source IP address in the ARP message is the IP address of the terminal device. A source MAC address in the ARP message is the MAC address of the terminal device, and a destination MAC address in the ARP message is a broadcast MAC address.

Optionally, the ARP message may be a gratuitous ARP packet, and the gratuitous ARP packet is a broadcast packet.

S505: The first UPF network element sends the ARP message to a switch.

S506: The switch updates a MAC address table based on the ARP message.

For example, it is assumed that before the terminal device is moved, the MAC address table in the switch is shown in Table 3.

TABLE 3

| MAC address table | |
| --- | --- |
| MAC address | Port number |
| MAC address of an application server | Port 1 |
| MAC address of the terminal device | Port 2 |

The application server is connected to the switch through the port 1, and a second UPF is connected to the switch through the port 2.

Assuming that the first UPF network element is connected to the switch through a port 3, and the switch receives, through the port 3, the ARP message sent by the first UPF network element. Because the source MAC address in the ARP message is the MAC address of the terminal device, based on the ARP message, the switch may update the MAC address table shown in Table 3 to the MAC address table shown in Table 4.

TABLE 4

| MAC address table | |
| --- | --- |
| MAC address | Port number |
| MAC address of the application server | Port 1 |
| MAC address of the terminal device | Port 3 |

It can be learned from the MAC address table shown in Table 4 that when the switch receives, through the port 1, a downlink packet (in which a source MAC address is the MAC address of the application server, and a destination MAC address is the MAC address of the terminal device) sent by the application server to the terminal device, the switch forwards the packet to the first UPF through the port 3 based on the MAC address table. When the switch receives, through the port 3, an uplink packet (in which a source MAC address is the MAC address of the terminal device, and a destination MAC address is the MAC address of the application server) sent by the terminal device to the application server, the switch forwards the packet to the application server through the port 1 based on the MAC address table.

S507: The application server sends a downlink data packet to the switch.

A destination MAC address in the downlink data packet is the MAC address of the terminal device.

S508: The switch sends the downlink data packet to the first UPF network element based on the updated MAC address table.

For example, referring to Table 4, after receiving, through the port 1, the downlink data packet sent by the application server to the terminal device, the switch may determine, based on the MAC address table, to send the downlink data packet through the port 3 such that the downlink data packet can be sent to the first UPF network element.

S509: The first UPF network element sends the downlink data packet to the terminal device.

It should be noted that in the embodiment shown in FIG. 5A and FIG. 5B, when the first UPF network element does not have the ARP proxy function, the SMF network element may further generate the ARP message. For a process in which the SMF network element generates the ARP message, refer to the embodiment shown in FIG. 4A and FIG. 4B. Details are not described herein again in this application.

In the embodiment shown in FIG. 5A and FIG. 5B, the SMF network element may obtain the MAC address and the IP address of the terminal device from the DN-AAA server. After the terminal device moves and selects a new first UPF network element, the SMF network element sends the MAC address and the IP address of the terminal device to the first UPF network element. Because the first UPF network element has the ARP proxy function and obtains the MAC address and the IP address of the terminal device, the first UPF network element may send the ARP message. The ARP message is an uplink packet. Therefore, the switch can update the MAC address table based on the ARP message. In this way, after the terminal device moves, when the application server sends a downlink data packet to the terminal device, the switch may forward the downlink data packet to a correct UPF network element (the first UPF network element selected by the terminal device after the terminal device moves) based on the updated MAC address table such that the correct UPF network element can successfully forward the downlink data packet to the terminal device. Therefore, a loss of the downlink data packet is avoided, thereby improving data transmission reliability.

Figure 6A:
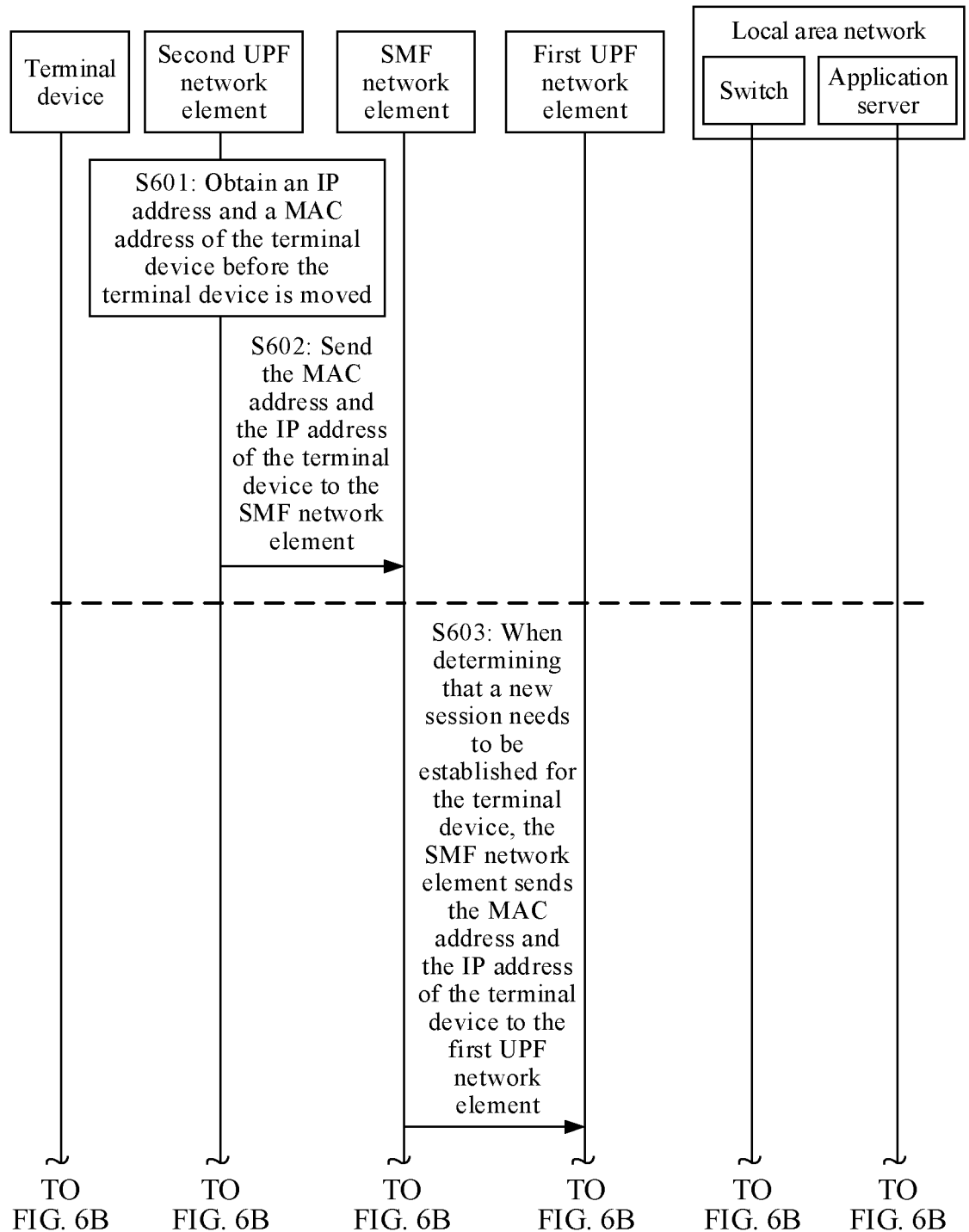
FIG. 6A and FIG. 6B are a fifth schematic flowchart of a data processing method according to this application.
Figure 6B:
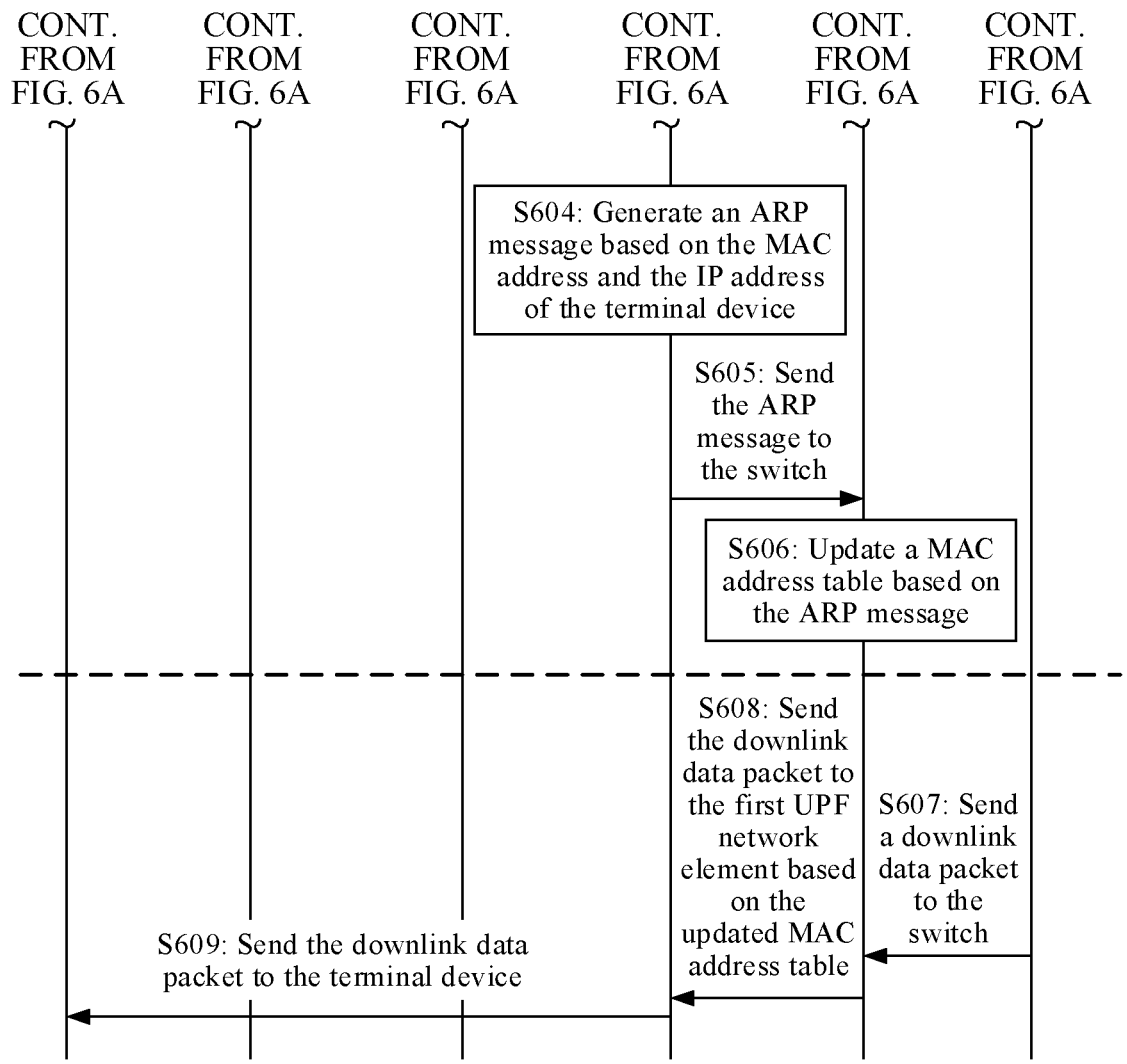

FIG. 6A and FIG. 6B are a fifth schematic flowchart of a data processing method according to this application. In the embodiment shown in FIG. 6A and FIG. 6B, an example in which an SMF network element and a UPF network element is used for description. It is assumed that a UPF network element selected by the terminal device before the terminal device is moved is a second UPF network element, a UPF network element selected by the terminal device after the terminal device moves is a first UPF network element, and the first UPF network element has an ARP proxy function. Referring to FIG. 6A and FIG. 6B, the method may include the following steps.

S601: Before a terminal device is moved, a second UPF network element obtains an IP address and a MAC address of the terminal device.

Optionally, the second UPF network element may obtain the MAC address and the IP address of the terminal device by monitoring a data packet.

S602: The second UPF network element sends the MAC address and the IP address of the terminal device to an SMF network element.

Optionally, after receiving the MAC address and the IP address of the terminal device, the SMF network element may store the MAC address and the IP address of the terminal device.

S603: When determining that a new session needs to be established for the terminal device, the SMF network element sends the MAC address and the IP address of the terminal device to a first UPF network element.

S604: The first UPF network element generates an ARP message based on the MAC address and the IP address of the terminal device.

The ARP message includes the MAC address and the IP address of the terminal device.

S605: The first UPF network element sends the ARP message to a switch.

S606: The switch updates a MAC address table based on the ARP message.

It should be noted that S603 to S606 and S607 to S609 are processes independent of each other, and S607 does not necessarily need to be performed after S606.

S607: The application server sends a downlink data packet to the switch.

A destination MAC address in the downlink data packet is the MAC address of the terminal device.

S608: The switch sends the downlink data packet to the first UPF network element based on the updated MAC address table.

S609: The first UPF network element sends the downlink data packet to the terminal device.

It should be noted that for execution processes of S603 to S609, refer to S503 to S509. Details are not described herein again in this application.

It should be noted that in the embodiment shown in FIG. 6A and FIG. 6B, when the first UPF network element does not have the ARP proxy function, the SMF network element may further generate the ARP message. For a process in which the SMF network element generates the ARP message, refer to the embodiment shown in FIG. 4A and FIG. 4B. Details are not described herein again in this application.

In the embodiment shown in FIG. 6A and FIG. 6B, before the terminal device is moved, the second UPF network element selected by the terminal device may obtain the MAC address and the IP address of the terminal device, and send the MAC address and the IP address of the terminal device to the SMF network element. After the terminal device moves and selects a new first UPF network element, the SMF network element sends the MAC address and the IP address of the terminal device to the first UPF network element. Because the first UPF network element has the ARP proxy function and obtains the MAC address and the IP address of the terminal device, the first UPF network element may send the ARP message. The ARP message is an uplink packet. Therefore, the switch can update the MAC address table based on the ARP message. In this way, after the terminal device moves, when the application server sends a downlink data packet to the terminal device, the switch may forward the downlink data packet to a correct UPF network element (the first UPF network element selected by the terminal device after the terminal device moves) based on the updated MAC address table such that the correct UPF network element can successfully forward the downlink data packet to the terminal device. Therefore, a loss of the downlink data packet is avoided, thereby improving data transmission reliability.

It should be noted that all the foregoing embodiments are solutions used when the UPF network element detects that an Ethernet data packet is an IP-type data packet. When the UPF network element detects that an Ethernet data packet is a non-IP-type data packet, the switch may learn the latest MAC address table in the following feasible implementations. This may be implemented in at least the following two feasible implementations In one feasible implementation, it is assumed that a UPF network element selected by the terminal device before the terminal device is moved is the second UPF network element, and a network element selected by the terminal device after the terminal device moves is the first UPF network element.

Optionally, after the SMF network element detects that a new session needs to be established for the terminal device, the SMF network element determines that a UPF network element serving the terminal device is the first UPF network element, and the SMF network element sends indication information to the terminal device, where the indication information indicates to the terminal device to send an uplink data packet. The terminal device sends the uplink data packet according to the indication information. The uplink data packet may be a broadcast packet, and a source MAC address in the uplink data packet may be the MAC address of the terminal device. Optionally, the terminal device may send the uplink data packet using a Multiple MAC Registration Protocol (MMRP), where the uplink data packet is an uplink general packet.

The uplink data packet is sent to the switch in the LAN using the first UPF network element, and the switch updates the MAC address table based on the uplink data packet. When the application server sends a downlink data packet to the terminal device, the switch may send the downlink data packet to the first UPF network element based on the updated MAC address table such that the first UPF network element can successfully forward the downlink data packet to the terminal device. Therefore, a loss of the downlink data packet is avoided, thereby improving data transmission reliability.

In another feasible implementation, it is assumed that a UPF network element selected by the terminal device before the terminal device is moved is the second UPF network element, and a network element selected by the terminal device after the terminal device moves is the first UPF network element.

Optionally, after the SMF network element detects that a new session needs to be established for the terminal device, the SMF network element determines that a UPF network element serving the terminal device is the first UPF network element, and the SMF network element sends indication information to the first UPF network element, where the indication information indicates to the first UPF network element to send an uplink data packet. The first UPF network element sends an uplink data packet according to the indication information, where a source MAC address in the uplink data packet may be the MAC address of the terminal device, and a destination MAC address in the uplink data packet may be a MAC address of the switch. Optionally, the first UPF network element may send the uplink data packet using an MMRP protocol, and the uplink data packet is an uplink general packet.

After the switch receives the uplink data packet, the switch updates the MAC address table based on the uplink data packet. In this way, when the application server sends a downlink data packet to the terminal device, the switch may send the downlink data packet to the first UPF network element based on the updated MAC address table such that the first UPF network element can successfully forward the downlink data packet to the terminal device. Therefore, a loss of the downlink data packet is avoided, thereby improving data transmission reliability.

Figure 7:
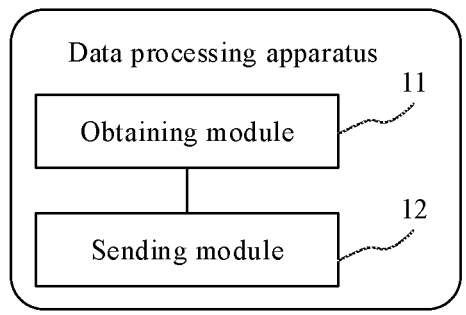
FIG. 7 is a first schematic structural diagram of a data processing apparatus according to this application.

FIG. 7 is a first schematic structural diagram of a data processing apparatus according to this application. Referring to FIG. 7, the apparatus may include an obtaining module 11 and a sending module 12.

The obtaining module 11 is configured to obtain, from an external network element, a MAC address of a terminal device and an IP address corresponding to the MAC address.

The sending module 12 is configured to send the MAC address and the IP address to a first UPF network element, where the MAC address and the IP address are used to send an ARP message, and the ARP message includes the MAC address and the IP address.

The data processing apparatus provided in this application can perform the technical solutions shown in the foregoing method embodiments. Their implementation principles and beneficial effects are similar, and details are not described herein again.

In a possible implementation, the obtaining module 11 is further configured to obtain the MAC address and the IP address from a server.

In another possible implementation, the sending module 12 is further configured to before the obtaining module obtains the MAC address and the IP address from the server, send a first request message to the server, where the first request message is used to request to obtain the MAC address of the terminal device and the IP address of the terminal device.

In another possible implementation, the server is a DN-AAA server.

In another possible implementation, the obtaining module 11 is further configured to receive the IP address and the MAC address from a second UPF network element, where the first UPF network element is a UPF network element selected by the terminal device after the terminal device moves, and the second UPF network element is a UPF network element selected by the terminal device before the terminal device is moved.

In another possible implementation, the MAC address and the IP address are further used to generate the ARP message.

Figure 8:
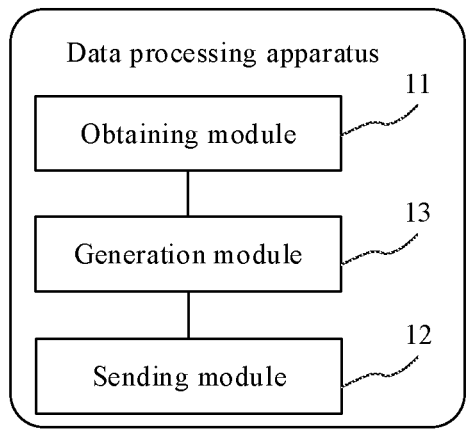
FIG. 8 is a second schematic structural diagram of a data processing apparatus according to this application.

FIG. 8 is a second schematic structural diagram of a data processing apparatus according to this application. Based on the embodiment shown in FIG. 7, referring to FIG. 8, the apparatus further includes a generation module 13.

The generation module 13 is configured to generate the ARP message.

The sending module 12 is further configured to send the ARP message including the MAC address and the IP address to the first UPF network element.

The data processing apparatus provided in this application can perform the technical solutions shown in the foregoing method embodiments. Their implementation principles and beneficial effects are similar, and details are not described herein again.

In the embodiments shown in FIG. 7 and FIG. 8, optionally, the obtaining module 11 may perform S201 in the embodiment shown in FIGS. 2, S301 and S302 in the embodiment shown in FIG. 3A and FIG. 3B, S401 and S402 in the embodiment shown in FIG. 4A and FIG. 4B, S501 and S502 in the embodiment shown in FIG. 5A and FIG. 5B, and S602 in the embodiment shown in FIG. 6A and FIG. 6B. For specific execution processes and corresponding beneficial effects, refer to the descriptions in the method embodiments. Details are not described herein again.

Optionally, the sending module 12 may perform S202 in the embodiment shown in FIG. 2, S303 in the embodiment shown in FIG. 3A and FIG. 3B, S407 in the embodiment shown in FIG. 4A and FIG. 4B, S503 in the embodiment shown in FIG. 5A and FIG. 5B, and S603 in the embodiment shown in FIG. 6A and FIG. 6B. For specific execution processes and corresponding beneficial effects, refer to the descriptions in the method embodiments. Details are not described herein again.

Optionally, the generation module 13 may perform S306 in the embodiment shown in FIG. 3A and FIG. 3B and S406 in the embodiment shown in FIG. 4A and FIG. 4B. For specific execution processes and corresponding beneficial effects, refer to the descriptions in the method embodiments. Details are not described herein again.

Figure 9:
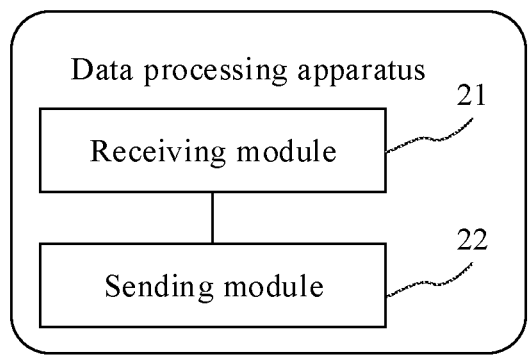
FIG. 9 is a first schematic structural diagram of another data processing apparatus according to this application.

FIG. 9 is a first schematic structural diagram of another data processing apparatus according to this application. Referring to FIG. 9, the apparatus may include a receiving module 21 and a sending module 22.

The receiving module 21 is configured to receive, from an SMF network element, a MAC address and an IP address corresponding to the MAC address.

The sending module 22 is configured to send an ARP message based on the MAC address and the IP address, where the ARP message includes the MAC address and the IP address.

The data processing apparatus provided in this application can perform the technical solutions shown in the foregoing method embodiments. Their implementation principles and beneficial effects are similar, and details are not described herein again.

Figure 10:
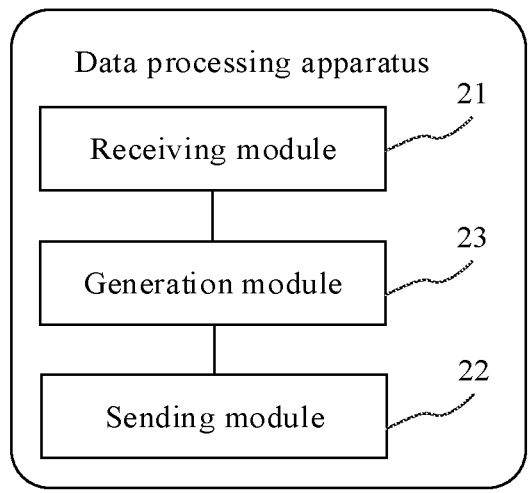
FIG. 10 is a second schematic structural diagram of another data processing apparatus according to this application.

FIG. 10 is a second schematic structural diagram of another data processing apparatus according to this application. Based on the embodiment shown in FIG. 9, referring to FIG. 10, the apparatus further includes a generation module 23.

The generation module 23 is configured to generate the ARP message based on the MAC address and the IP address.

The sending module 22 is further configured to send the ARP message.

In another possible implementation, the receiving module 21 is further configured to receive the ARP message from the SMF network element, where the ARP message includes the MAC address and the IP address.

The sending module 22 is further configured to forward the ARP message.

The data processing apparatus provided in this application can perform the technical solutions shown in the foregoing method embodiments. Their implementation principles and beneficial effects are similar, and details are not described herein again.

In the embodiments shown in FIG. 9 and FIG. 10, the receiving module 21 may perform S202 in the embodiment shown in FIG. 2, S303 in the embodiment shown in FIG. 3A and FIG. 3B, S407 in the embodiment shown in FIG. 4A and FIG. 4B, S503 in the embodiment shown in FIG. 5A and FIG. 5B, and S603 in the embodiment shown in FIG. 6A and FIG. 6B. For specific execution processes and corresponding beneficial effects, refer to the descriptions in the method embodiments. Details are not described herein again.

Optionally, the sending module 22 may perform S203 in the embodiment shown in FIG. 2, S307 in the embodiment shown in FIG. 3A and FIG. 3B, S408 in the embodiment shown in FIG. 4A and FIG. 4B, S505 in the embodiment shown in FIG. 5A and FIG. 5B, and S605 in the embodiment shown in FIG. 6A and FIG. 6B. For specific execution processes and corresponding beneficial effects, refer to the descriptions in the method embodiments. Details are not described herein again.

Optionally, the generation module 23 may perform S306 in the embodiment shown in FIG. 3A and FIG. 3B, S504 in the embodiment shown in FIG. 5A and FIG. 5B, and S604 in the embodiment shown in FIG. 6A and FIG. 6B. For specific execution processes and corresponding beneficial effects, refer to the descriptions in the method embodiments. Details are not described herein again.

Figure 11:
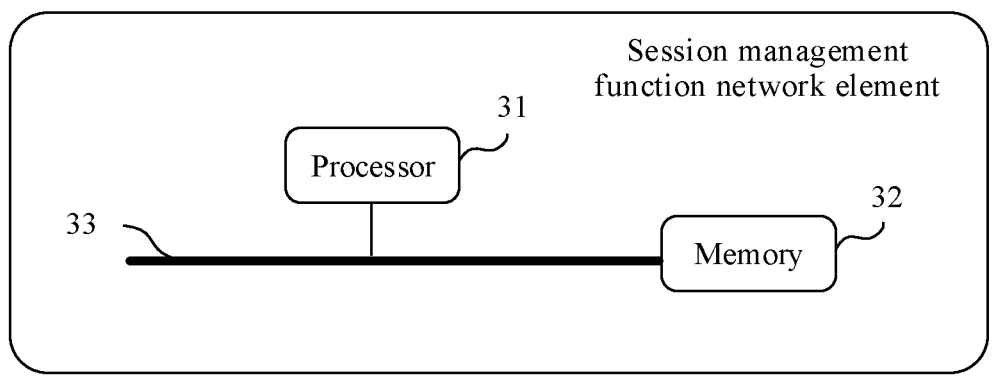
FIG. 11 is a schematic structural diagram of an SMF network element according to this application.

FIG. 11 is a schematic structural diagram of an SMF network element according to this application. Referring to FIG. 11, the SMF network element includes a processor 31, a memory 32, and a communications bus 33, where the communications bus 33 is configured to implement a connection between components, the memory 32 is configured to store a program instruction, and the processor 31 is configured to read the program instruction in the memory 32, and perform the methods according to the embodiments shown in FIG. 2 to FIG. 6B according to the program instruction in the memory 32. Optionally, the processor 31 can perform processing, other than information transceiving, of the SMF network element in the embodiments shown in FIG. 2 to FIG. 6B. Their implementation principles and beneficial effects are similar, and details are not described herein again.

Figure 12:
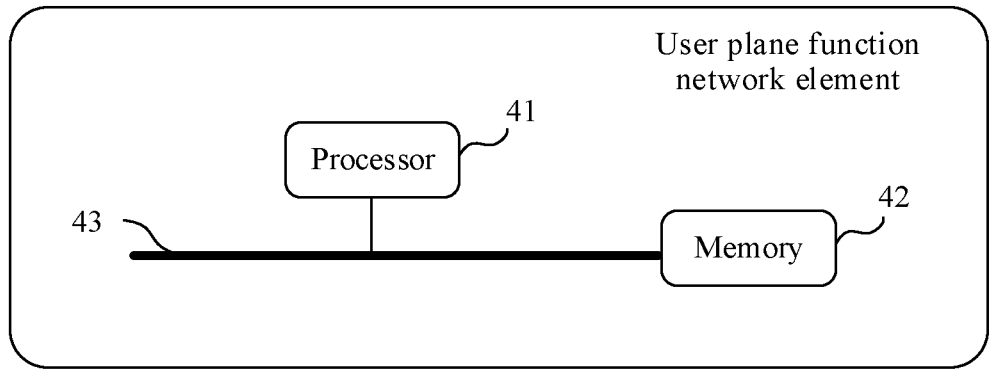
FIG. 12 is a schematic structural diagram of a UPF network element according to this application.

FIG. 12 is a schematic structural diagram of a UPF network element according to this application. Referring to FIG. 12, the UPF network element includes a processor 41, a memory 42, and a communications bus 43, where the communications bus 43 is configured to implement a connection between components, the memory 42 is configured to store a program instruction, and the processor 41 is configured to read the program instruction in the memory 42, and perform the method according to the embodiments shown in FIG. 2 to FIG. 6B according to the program instruction in the memory 42. Optionally, the processor 41 can perform processing, other than information transceiving, of the UPF network element in the embodiments shown in FIG. 2 to FIG. 6B. Their implementation principles and beneficial effects are similar, and details are not described herein again.

This application provides a computer-readable storage medium. The computer-readable storage medium stores an instruction, and when the instruction is run on a computer, the computer is enabled to perform the method shown in any one of the foregoing method embodiments.

This application provides a computer program product. The computer program product includes a computer-executable instruction, where the computer-executable instruction is stored in a computer-readable storage medium. At least one processor may read the computer-executable instruction from the computer-readable storage medium, and execute the computer-executable instruction to perform the data processing method shown in any one of the foregoing method embodiments.

This application provides a chip system. The chip system includes a processor configured to support implementation of a function in any one of the foregoing method embodiments, for example, generating or processing data and/or information in the foregoing methods. In a possible design, the chip system further includes a memory. The memory is configured to store a necessary program instruction and necessary data. The chip system may include a chip, or may include a chip and another discrete device.

It may be understood that FIG. 11 and FIG. 12 show merely simplified designs of the foregoing devices. During actual application, each of the foregoing devices may include any quantity of transmitters, receivers, processors, controllers, memories, communications units, or the like. All devices that can implement this application fall within the protection scope of this application.

The processor configured to execute the foregoing SMF network element or the foregoing UPF network element in this application may be a central processing unit (CPU), a general purpose processor, a digital signal processor (DSP), an application-specific integrated circuit (ASIC), a field programmable gate array (FPGA), another programmable logic device, or a transistor logic device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

Method or algorithm steps described in combination with the content disclosed in this application may be implemented by hardware, or may be implemented by a processor by executing a software instruction. The software instruction may be formed by a corresponding software module. The software module may be located in a random access memory (RAM), a flash memory, a read-only memory (ROM), an erasable programmable ROM (EPROM) memory, an electrically EPROM (EEPROM), a register, a hard disk, a removable magnetic disk, a compact-disc ROM (CD-ROM), or a storage medium of any other form known in the art. For example, a storage medium is coupled to a processor such that the processor can read information from the storage medium or write information into the storage medium. Certainly, the storage medium may be a component of the processor. The processor and the storage medium may be located in the ASIC. In addition, the ASIC may be located in the SMF network element. Certainly, the processor and the storage medium may alternatively exist in the SMF network element or the UPF network element as discrete components.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a FLOPPY DISK, a hard disk, or a magnetic tape), an optical medium (for example, a digital versatile disc (DVD)), a semiconductor medium (for example, a solid-state drive (SSD)), or the like.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on technical solutions of this application shall fall within the protection scope of this application.

What is claimed is:

1. A session management apparatus comprising:
    a processor configured to determine, after a terminal device moves, a user plane apparatus serving the terminal device; and
    a transmitter coupled to the processor and configured to send indication information to the user plane apparatus, wherein the indication information indicates to the user plane apparatus to send, to a switch, an uplink data packet comprising a source media access control (MAC) address set to a MAC address of the terminal device.

2. The session management apparatus of claim 1, wherein the uplink data packet further comprises a destination MAC address set to a MAC address of the switch receiving the uplink data packet.

3. The session management apparatus of claim 1, wherein the uplink data packet is a non-Internet Protocol (IP)-type data packet.

4. The session management apparatus of claim 1, wherein the processor is further configured to detect that a new session needs to be established for the terminal device.

5. The session management apparatus of claim 4, wherein the processor is further configured to receive the MAC address of the terminal device.

6. The session management apparatus of claim 1, wherein the indication information comprises the MAC address of the terminal device.

7. A user plane apparatus comprising:
    a processor configured to provide a service for a terminal device after the terminal device moves;
    a receiver coupled to the processor and configured to receive indication information from a session management apparatus, wherein the indication information indicates to send an uplink data packet; and
    a transmitter coupled to the processor and configured to send, to a switch, the uplink data packet according to the indication information, wherein a source media access control (MAC) address in the uplink data packet is a MAC address of the terminal device.

8. The user plane apparatus of claim 7, wherein a destination MAC address in the uplink data packet is a MAC address of the switch receiving the uplink data packet.

9. The user plane apparatus of claim 7, wherein the uplink data packet is a non-Internet Protocol (IP)-type data packet.

10. The user plane apparatus of claim 7, wherein the transmitter is further configured to send the uplink data packet according to the indication information using a Multiple MAC Registration Protocol (MMRP).

11. The user plane apparatus of claim 7, wherein the indication information comprises the MAC address of the terminal device.

12. The user plane apparatus of claim 11, wherein the processor is further configured to generate the uplink data packet using the MAC address of the terminal device.

13. A data processing method comprising:
   determining, by a session management apparatus after a terminal device moves, a user plane apparatus serving the terminal device;
   sending, by the session management apparatus, indication information to the user plane apparatus;
   receiving, by the user plane apparatus, the indication information from the session management apparatus; and
   sending, by the user plane apparatus to a switch and responsive to the indication information, an uplink data packet, wherein a source media access control (MAC) address in the uplink data packet is a MAC address of the terminal device.

14. The data processing method of claim 13, wherein a destination MAC address in the uplink data packet is a MAC address of the switch receiving the uplink data packet.

15. The data processing method of claim 13, wherein before sending the indication information to the user plane apparatus, the data processing method further comprises receiving, by the session management apparatus, the MAC address of the terminal device.

16. The data processing method of claim 13, wherein the indication information comprises the MAC address of the terminal device.

17. The data processing method of claim 13, wherein before sending the uplink data packet, the data processing method further comprises generating, by the user plane apparatus, the uplink data packet using the MAC address of the terminal device.

18. The data processing method of claim 13, wherein the uplink data packet is a non-Internet Protocol (IP)-type data packet.

19. The data processing method of claim 13, wherein before determining the user plane apparatus, the data processing method further comprises detecting that a new session needs to be established for the terminal device.

20. The data processing method of claim 13, further comprising sending, by the user plane apparatus, the uplink data packet according to the indication information using a Multiple MAC Registration Protocol (MMRP).

* * * * *